July 19, 1927.

J. W. WELSH 1,636,339

OPHTHALMIC MOUNTING

Filed Oct. 19, 1922

Inventor:-
James W. Welsh.
By David Rines
Attorney;-

Patented July 19, 1927.

1,636,339

UNITED STATES PATENT OFFICE.

JAMES W. WELSH, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed October 19, 1922. Serial No. 595,542.

The present invention relates to ophthalmic mountings, more particularly spectacles, and the object of the invention is to provide an improved bridge for mountings of this character.

Figure 1:
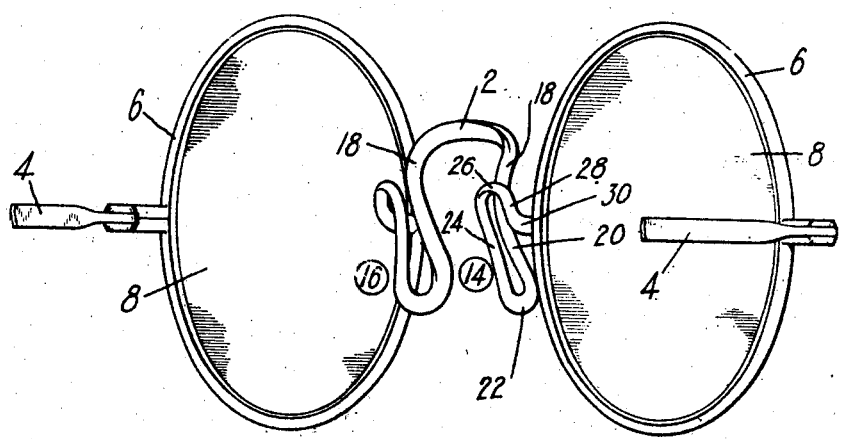
Figure 2:
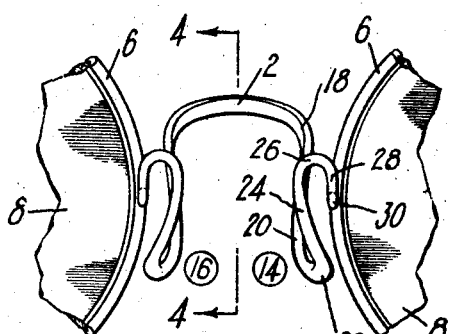
Figure 4:
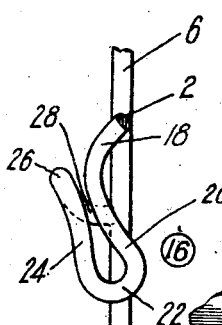
Figure 5:
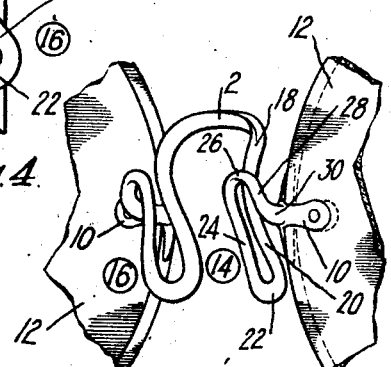
Figure 3:
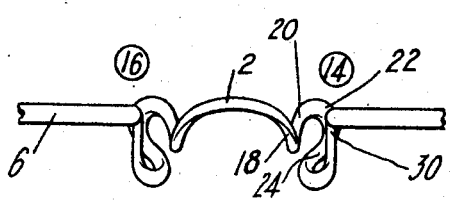

The invention will be explained with reference to the accompanying drawings, in which Fig. 1 is a perspective view from the rear of a pair of spectacles constructed according to a preferred embodiment of the present invention, the temples being shown broken away; Fig. 2 is a fragmentary rear elevation of the same; Fig. 3 is a plan of the portion of the mounting shown in Fig. 1; Fig. 4 is a section taken upon the line 4—4 of Fig. 2, looking in the direction of the arrows; and Fig. 5 is a fragmentary rear perspective view similar to Fig. 1 of a modification.

Spectacles ordinarily comprise a bridge 2 that rests on the wearer's nose and temples 4 that engage the wearer's ears. The bridge and the temples are shown in Fig. 1 connected to lens rims 6 within which are mounted lenses 8. In the modification of Fig. 5, the bridge and the temples are connected to an ear or ears 10 for clamping rimless lenses 12. The essential novelty of this invention resides in the bridge 2.

In spectacles of common construction, the bridges rest upon the upper front surface of the nose in such fashion as to permit the spectacles to tilt readily about the point of support. This is undesirable, particularly for those wearers who are troubled with astigmatism, for even a very slight derangement of position of the lenses causes them severe eye strain. Various devices for holding the bridge rigid upon the nose have therefore been tried, among them spring-pressed guards such as are used in the pince-nez type of eyeglasses, and guards rigid with the bridge for firmly, though lightly, gripping the sides of the nose. The former cause unnecessary pressure to bear upon the nose, and the latter have been unnecessarily complex, without affording a sufficiently large bearing, and they have not, furthermore, been adapted for all the niceties of adjustment that are required by the facial characteristics of a large number of wearers.

According to the present invention, two guards 14 and 16 are rigidly connected to the nose bridge 2 by bending out of a single length of wire as follows: Commencing at the bridge, the wire is first bent downward, rearward and inward at 18, then downward, forward and inward at 20, then rearward and outward at 22, then upward, rearward and inward at 24, then outward at 26, and downward and forward at 28, being finally secured at 30 to a lens rim 6 or ears 10. The bends 18, 20, 22 and 24 engage the sides of the nose firmly, affording a very long bearing, and they may be made more or less pronounced as necessary to suit the individual wearer; the bend 26 permits of a very wide range of adjustment corresponding to the wearer's pupillary distance; and the bend 28 serves to connect the guard 14 or 16 to its lens rim or ear. This construction is as efficient as it is simple.

The invention is clearly not restricted to the exact bends hereinbefore described, for modifications will readily suggest themselves to persons skilled in the art, and all such changes are considered to be within the spirit and scope of the invention as defined in the appended claims.

What is claimed as new is:

1. A nose guard bent downward, upward, directly outward and forward.

2. A nose guard bent downward, rearward and inward, then downward, forward, and inward, then rearward and outward, then upward, rearward and inward, then directly outward, and finally downward and forward.

3. A spectacle frame comprising a bridge, guards connected to the bridge and lens-holding members connected to the guards, each guard being bent downward, rearward and inward at its junction with the bridge, then downward, forward and inward, then rearward and outward, then upward, rearward and inward, then directly outward, then downward and forward, being finally connected to its lens-holding member.

In testimony whereof, I have hereunto subscribed my name this 30th day of Aug. 1922.

JAMES W. WELSH.